(12) United States Patent
Kocdemir

(10) Patent No.: US 11,295,482 B2
(45) Date of Patent: Apr. 5, 2022

(54) IMAGE CODING SYSTEM AND METHOD

(71) Applicant: Sony Interactive Entertainment Inc., Tokyo (JP)

(72) Inventor: Sahin Serdar Kocdemir, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/198,347

(22) Filed: Mar. 11, 2021

(65) Prior Publication Data

US 2021/0304442 A1 Sep. 30, 2021

(30) Foreign Application Priority Data

Mar. 26, 2020 (GB) ...................................... 2004379

(51) Int. Cl.
  *G06T 9/00* (2006.01)
  *G06T 17/20* (2006.01)

(52) U.S. Cl.
  CPC .............. *G06T 9/001* (2013.01); *G06T 17/20* (2013.01)

(58) Field of Classification Search
  None
  See application file for complete search history.

(56) References Cited

U.S. PATENT DOCUMENTS

| | | | |
|---|---|---|---|
| 6,438,266 B1* | 8/2002 | Bajaj | G06T 9/001 382/154 |
| 6,459,429 B1* | 10/2002 | Deering | G06T 17/20 345/423 |
| 6,577,310 B1* | 6/2003 | Kim | G06T 9/001 345/420 |
| 8,558,842 B1 | 10/2013 | Johnson | |
| 2011/0109638 A1* | 5/2011 | Duluk, Jr. | G06F 9/3887 345/522 |
| 2016/0021501 A1* | 1/2016 | Sambongi | G04R 20/06 455/456.3 |

(Continued)

FOREIGN PATENT DOCUMENTS

| EP | 2023292 A1 | 2/2009 |
|---|---|---|
| EP | 2037416 A2 | 3/2009 |

OTHER PUBLICATIONS

Combined Search and Examination Report for corresponding GB Application No. 2004379.0, 9 pages, dated Sep. 23, 2020.

*Primary Examiner* — Sultana M Zalalee
(74) *Attorney, Agent, or Firm* — Matthew B. Dernier, Esq.

(57) ABSTRACT

An encoding system comprising a triangle strip identification unit operable to identify a plurality of triangle strips representing at least a portion of a three-dimensional object mesh, an restart identification unit operable to identify one or more restart indices used to signify the start of a new triangle strip, a structure identification unit operable to identify one or more arrangements of triangles within the triangle strips, a data generation unit operable to generate data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices, and a content encoding unit operable to encode the generated data for output.

14 Claims, 5 Drawing Sheets

(56) References Cited

U.S. PATENT DOCUMENTS

2017/0178401 A1    6/2017   Agrawal
2018/0137676 A1*   5/2018   Arrabi ..................... G06T 15/80
2019/0228566 A1*   7/2019   Rusin ...................... G06T 17/20

* cited by examiner

IMAGE CODING SYSTEM AND METHOD

BACKGROUND OF THE INVENTION

Field of the Invention

This disclosure relates to an image coding system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, the demand for realistic and immersive computer generated imagery has increased substantially; this includes both still images and video content, such as movies or video games. Such content is defined by having a high image quality (for example, highly detailed models and textures) in conjunction with a reproduction of naturally occurring visual effects such as reflections—the goal is to generate an image or video which is visually indistinguishable from the view a user would have if they were in a real-world environment with the same features.

This demand has been driven by a number factors, including improvements in processing technology (making such content more obtainable), improvements in display technology (reducing limitations on the outputs of the content generation), and the increased demand for virtual reality (VR) content. For example, games consoles have significantly increased in their processing capabilities in recent years, while virtual reality headsets have become widely available for home use.

Despite improvements in processing technology, there are still significant obstacles to generating such content. Significant drawbacks of a realistic content generation process may include the time taken to render the images, and the practicality of storing sufficiently detailed information to enable the generation of the content. It is therefore considered desirable to be able to reduce the storage and/or processing burden upon an image generation device in generating content for display.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
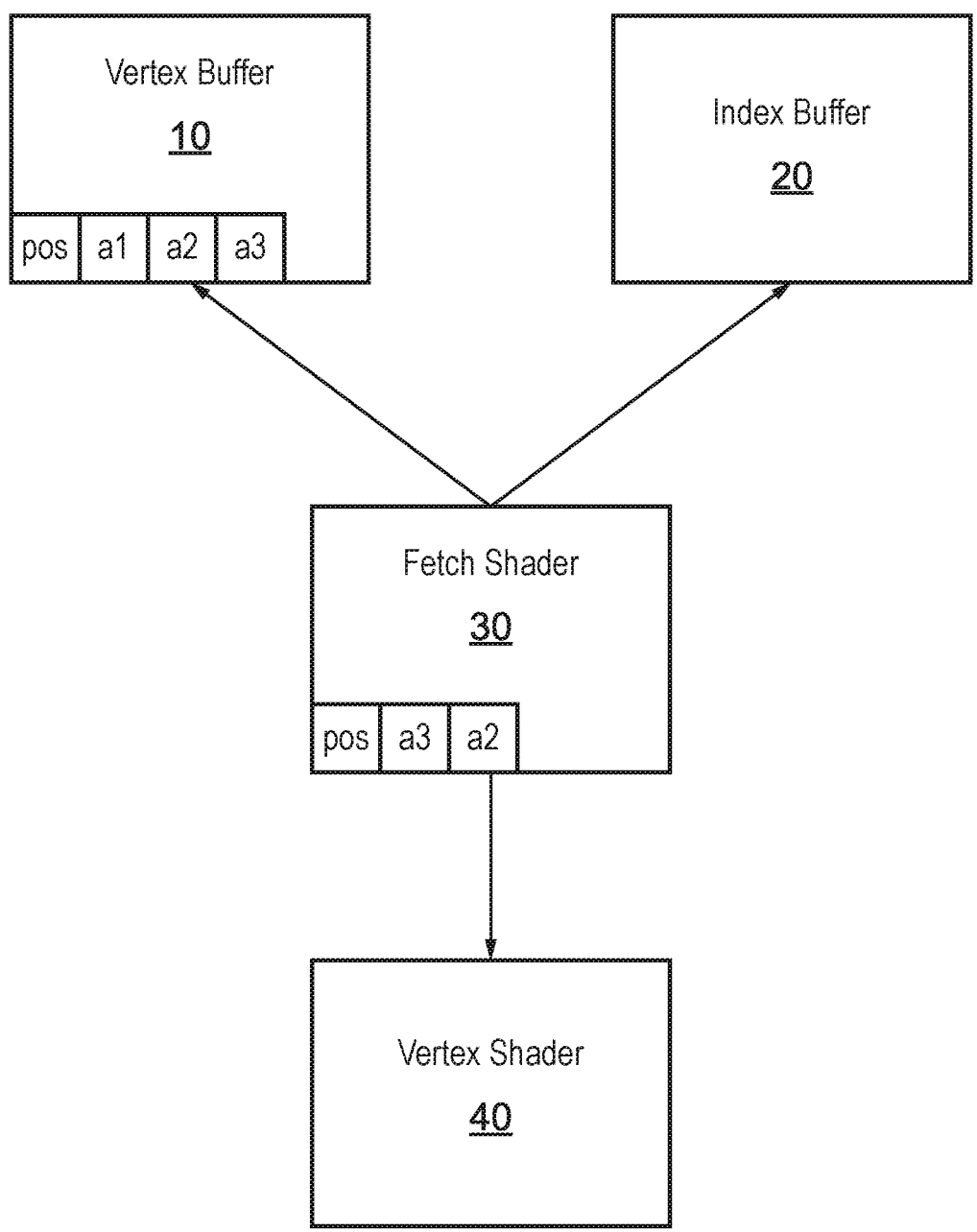
FIG. 1 schematically illustrates a vertex shading system.

Referring now to the drawings, wherein like reference numerals designate identical or corresponding parts throughout the several views, an improved system and method for encoding image content is disclosed.

FIG. 1 schematically illustrates a typical vertex shading arrangement. In this arrangement, the vertex buffer 10 stores information identifying a number of vertices and their three-dimensional location within a virtual environment to be rendered. The index buffer 20 stores the indices identifying the vertices, as stored in the vertex buffer 10, representing particular triangles (or other polygons) that may be rendered.

The triangles may be used to represent a three-dimensional mesh within a virtual environment, which (when combined with a corresponding texture) can represent an object in a generated image.

In FIG. 1, the vertex buffer 10 is shown as storing three sets of vertex attribute data (a1, a2, a3) along with 'pos' data. The attribute data a1, a2, a3, comprises information about the respective vertices such as colour, uv, and normal. The pos data comprises information about the positions of each of these vertices—this is generally in the form of a triplet of floating point numbers that describe a three-dimensional position. This position information is often stored in the vertex buffer in object space, which may be in the form of an array—this is considered to be a linear storage method.

A fetch shader 30 is operable to collect information from each of the vertex buffer 10 and the index buffer 20 and provide the information to the vertex shader 40, which is operable to perform a vertex shading process. The collected information corresponds only to the information that is required by the vertex shader 40 for a particular operation, rather than necessarily comprising the entire contents of each of the buffers 10 and 20. This is illustrated in FIG. 1 by the fetching only of pos, a3 and a2 by the fetch shader 30—thereby omitting a1 (and the corresponding position data) from the selection and further processing.

For example, when rendering a particular object within a scene, the fetch shader 30 may be operable to obtain a set of indices from the index buffer 20 that identify the vertices associated with that object. Corresponding vertex location data, as required to relate the indices to a shape that can be rendered correctly, are also obtained by the fetch shader 30 from the vertex buffer 10. The fetch shader 30 is then operable to pass this data to the vertex shader 40 and a vertex shading operation is performed. Examples of the operation of a vertex shader may include one or more of converting a three-dimensional vertex location into a two-dimensional screen position, and/or manipulating the position or colour associated with one or more vertices. This output is then provided to a further stage in the rendering pipeline, such as a geometry shader or a rasterizer.

Figure 2:
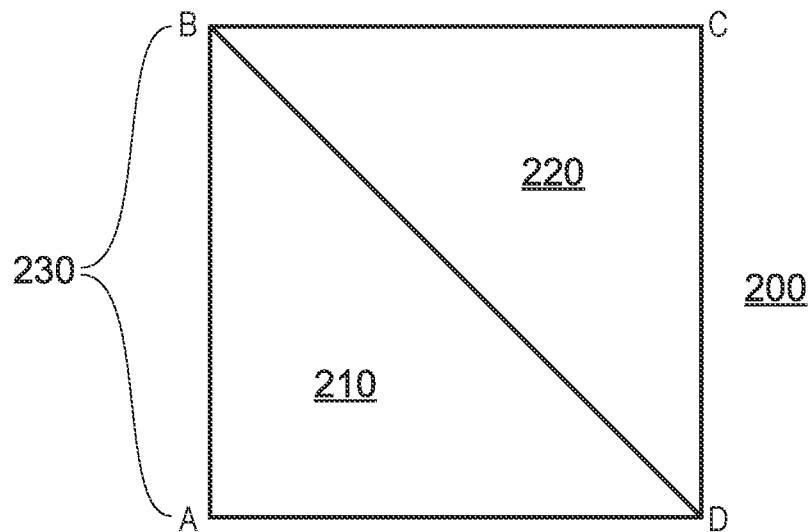
FIG. 2 schematically illustrates a pair of primitives.

FIG. 2 schematically illustrates an example of primitives that may be used in such a process. In this Figure, a square 200 is represented by a pair of primitives 210 and 220. Each of these primitives may be defined by three vertices 230, which can be used to reproduce the primitive.

In the example of FIG. 2, the vertex buffer stores position information for each of the vertices A, B, C, D. A corresponding index buffer stores information defining the triangles using these indices using triplets of vertices. For example, the information may be stored as:

Vertex Buffer—Vertices[ ]={A,B,C,D}

Index Buffer—Triangles[ ]={ABD,BCD}

In this manner, each of the primitives 210 and 220 may be reproduced using the information stored in these buffers. It should be noted that the order in which indices are provided in the index buffer (or the order in which they are read) may be varied as appropriate to generate triangles with the correct orientation. While such a representation may be suitable for a small shape such as the square 200 of FIG. 2, it may become rather inefficient to store primitive information in the index buffer in the form shown as the number of primitives increases.

Figure 3:
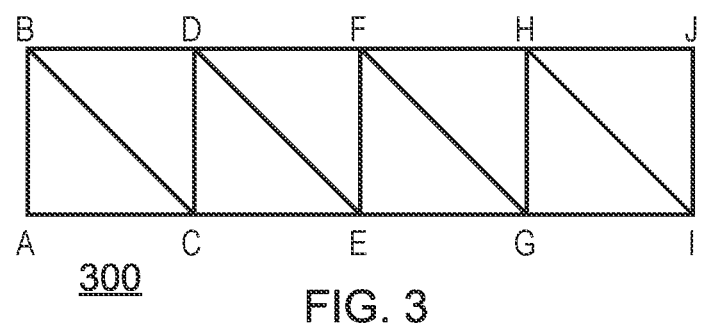
FIG. 3 schematically illustrates a first primitive cluster.

FIG. 3 shows an example of a shape that requires a larger number of primitives. In this example, the rectangle 300 is comprised of eight primitives that are each defined by a triplet of vertices from amongst the vertices labelled A through to J. This shape may be referred to as a primitive cluster, as it is comprised of a group (cluster) of primitives. Using the same method of representing the shape as above, this shape would be represented as:

Vertex Buffer—Vertices[ ]={A,B,C,D,E,F,G,H,I,J}

Index Buffer—Triangles[ ]={ABC,BCD,CDE,DFE, EFG,FGH,GHI,HIJ}

Such a method for representing the primitive data is rather data intensive in view of the fact that each of the triangles is represented by three indices—this means that twenty-four values are contained in the index buffer to represent the eight primitives (that is, three values per primitive). To alleviate this problem, encoding of primitive information can be performed using a triangle strip. Triangle strips are a logical encoding method in which the triangles are described in an order than enables redundant data to be reduced. For example, the rectangle 300 of FIG. 3 could be represented as:

Vertex Buffer—Vertices[ ]={A,B,C,D,E,F,G,H,I,J}

Index Buffer—TriangleStrip[ ]={A,B,C,D,E,F,G,H,I, J}

As each of the vertices is being used to define a primitive, the index buffer simply recites each of the vertices in the required order. When utilising the data in the index buffer, the first triangle may be identified using the first three indices (A, B, C), while the second triangle is defined by the three indices beginning with the second index (B, C, D), and so on. This effective means that each additional index defines a new primitive within the strip.

Such an encoding method is advantageous in that the number of values to represent the same shape is reduced significantly; instead of requiring twenty-four values as above, the index buffer now stores ten values. All else being equal, this is a reduction of data storage requirements of almost sixty percent for the index buffer. It is considered that there is a corresponding increase in the processing required to generate the index lists that are stored using such a coding scheme, although this may be deemed to be relatively low-impact in view of the fact that the index list is likely to only be encoded once.

One area in which such an encoding method may have a reduced efficiency is in the case that multiple triangle strips are defined for a three-dimensional model. In such a case, a restart index should be provided (in the index buffer) between the strips so as to indicate that the new strip is separate to the previous strip otherwise the indexes would not be separable and erroneous primitives would be identified. This increases the data storage overhead associated with the triangle strips, thereby reducing the efficiency of the encoding method.

Figure 4:
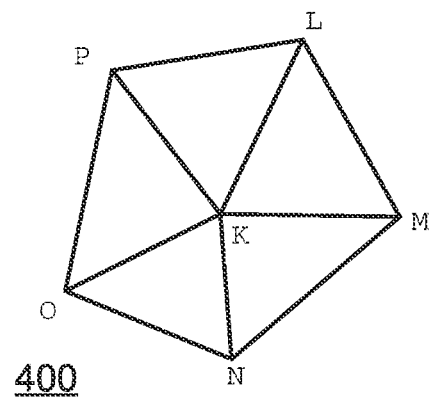
FIG. 4 schematically illustrates a second primitive cluster.

An additional drawback to such an encoding method is that of inefficiencies associated with representing primitive clusters which are not particularly well-suited to use with triangle strips. FIG. 4 schematically illustrates an example of such a cluster 400, which may be referred to as a triangle fan structure, comprising five primitives each represented by three of the six vertices. The following vertices may be referred to using a standard triangles list (Triangles[ ]), or a triangle strip (TriangleStrip[ ]) as follows:

Vertex Buffer—Vertices[ ]={K,L,M,N,O,P}

Index Buffer—Triangles[ ]={KLM,KMN,KNO,KOP, KPL}

Index Buffer-TriangleStrip[ ]={L,M,K,N,O,O,K,P,L}

Firstly, it should be noted that the data storage saving is not so significant in this example; the index buffer either stores the triangles using fifteen values, or stores a triangles list using nine values. This is both a lower percentage saving between the two, and a generally lower efficiency—here, nine values are used to represent five triangles (an average of 1.8 values per triangle), while in the example of FIG. 3 ten values were used to store eight triangles (an average of 1.25 values per triangle).

Secondly, it is apparent that the triangles list above actually generates seven triangles, rather than six, albeit the seventh triangle not being well-defined. This is at least partly because of the repeated use of the central vertex (K), which leads to the need to include the index repeatedly. This extra triangle (which may be referred to as a degenerate triangle) is represented by the triplet 'O, O, K' in the TriangleStrip[ ]. While the degenerate triangle can't be drawn (as two of the indices are the same, and it is therefore a zero-area shape), there is still an associated workload in processing the triangle when using the TriangleStrip as well as the associated cost in terms of data efficiency. In many cases, the use of a TriangleStrip may therefore result in a worse performance than the triangles list in which each primitive is individually identified—this may be particularly true as the size and/or complexity of defined primitive clusters increases.

Similar problems may exist for other arrangements of triangles within a triangle strip, rather than being limited only to triangle fan structures. Any arrangement of triangles may be considered suitable for processing to generate a more efficient representation if it leads to repeated indices or the generation of degenerate triangles or the like. It is envisaged that any identified structure may be encoded in a similar manner as to that of the triangle fan structure in that a flag may be provided which indicates that a particular index forms a part of that structure. In cases in which more than two structures are to be identified, an additional bitstream (or an additional field in the bitstream) may be provided, or the bitstream may comprise a multi-bit field so that values other than '0' and '1' may be encoded.

Figure 5:
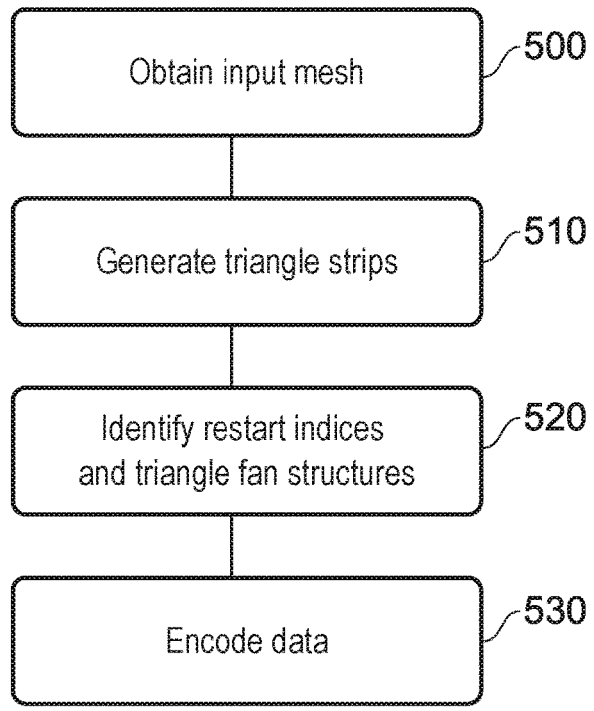
FIG. 5 schematically illustrates a data encoding method.

FIG. 5 schematically illustrates a method which seeks to mitigate the above problems. This method relates to an improved primitive generation process, so as to generate an encoded data set that represents a mesh more efficiently than in traditional methods.

A step 500 comprises obtaining an input mesh, for example representing an object within a virtual environment. The mesh is generally comprised of a number of primitives that together define a complex three-dimensional shape. This mesh may be obtained from any suitable source, such as a local data storage unit (such as a hard drive), a removable storage medium, or via any suitable network connection.

A step 510 comprises generating a plurality of triangle strips representing the input mesh. Any suitable existing method may be used to generate the triangle strips. For example, a method may comprise selecting an initial triangle to act as the starting point for the strip, and a direction in which to generate the strip. Triangles (that is, the index of the additional vertex required to reproduce each of those triangles) may be added to the strip as appropriate until an end condition is met at which point the strip is terminated. In some examples, a suitable end condition may be reaching a triangle that has no other triangles adjacent, or until a triangle which has already been added to a triangle list is reached. The process may be repeated until all primitives are encoded within a respective triangle strip, for example.

A step 520 comprises identifying one or more restart indices within the triangle strips, and identifying triangle fan structures present in the triangle strips. The restart indices are removed from the triangle strips, with their locations being recorded elsewhere so as to ensure that the information is not lost.

Triangle fan structures are those groups of primitives which have multiple uses of a single vertex as discussed with reference to FIG. 4; these are identified so as to perform a re-encoding of the indices to improve the efficiency of the index buffer encoding. This re-encoding is based upon the identification of a central vertex, and each of the vertices describing primitives that share that vertex. For example, in FIG. 4 the vertex K would be identified as the central vertex with each of the vertices L, M, N, 0, and P being identified as 'fan vertices' (or the like) such that the correct structure may be obtained.

A step 530 comprises encoding the resulting data to generate an encoded index buffer and an associated bitstream that together represent a plurality of primitive clusters. The encoded index buffer is generated so as to identify each of the vertices used to represent the primitive clusters, while the associated bitstream (which may be provided separately, or as a part of the encoded index buffer) is used to provide additional information relating to strip restarts and triangle fan structures.

To illustrate the benefits of the above method, consider the representation of the two primitive clusters as shown in FIGS. 3 and 4. In traditional arrangements, the following data would be stored:

Vertex Buffer—Vertices[ ]={A,B,C,D,E,F,G,H,I,J,&, K,L,M,N,O,P}

Index Buffer—TriangleStrip[ ]={A,B,C,D,E,F,G,H,I, J,&,L,M,K,N,O,O,K,P,L}

In this notation, the '&' represents a restart index, which effectively denotes the start of a new triangle strip within the index buffer. Having identified the same clusters in a process according to FIG. 5, the following output data may be obtained:

| Encoded Index Buffer | A | B | C | D | E | F | G | H | I | J | K | L | M | N | O | P |
|---|---|---|---|---|---|---|---|---|---|---|---|---|---|---|---|---|
| Triangle Strip Restart Bits | 0 | 0 | 0 | 0 | 0 | 0 | 0 | 0 | 0 | 0 | 1 | 0 | 0 | 0 | 0 | 0 |
| Triangle Fan ID Bits | 0 | 0 | 0 | 0 | 0 | 0 | 0 | 0 | 0 | 0 | 0 | 1 | 1 | 1 | 1 | 1 |

The first line comprises a list of each of the indices that are used to represent the primitive clusters, in an order which can be used to identify how to generate the cluster from the vertices. For instance, the first ten indices can be used to generate the cluster of FIG. 3 in accordance with the triangle strip method discussed above.

The second and third lines represent additional information that may be supplied either as a part of the index buffer or as a separate (but associated) bitstream. In particular, the second line comprises information identifying the start of a new triangle strip; that is, the first index of a new triangle strip is identified by a '1' in the corresponding entry in the second row. The third line comprises information identifying which vertices belong to a triangle fan structure.

In practice, a decoder may be configured to associate each of the vertices with a '1' as the triangle fan ID bit with the first vertex in the strip (here, the K), and a neighbouring vertex (including a wraparound, such that the P and L are also used to generate a triangle). In some embodiments, the decoder may instead be configured to associated the indices with a '1' as the triangle fan ID bit with the preceding index that has a '0' as the triangle fan ID bit, or indeed may use any other predefined method for determining the initial index of a triangle fan. That is to say, triangle fans are not restricted to being defined with respect to the first index in a triangle strip—they may have any initial index within a strip.

In some embodiments the second and third lines may be encoded in a more efficient manner, such as using a run length coding scheme, to reduce the amount of data required to store the information. Of course, any or all of the data discussed above may also (or instead) be subjected to any suitable data compression technique. Similarly, the generation of primitive clusters and the representative triangle strips may be guided so as to generate suitable outputs for such a representation.

While it is expected that such a method may increase the initial processing associated with generating the dataset (for example, in extracting the restart indices and performing the encoding), numerous advantages may be observed. For instance, the size of the index buffer may be reduced as it no longer need comprise restart indices (which may be a significant number of indices, when representing larger models), and the number of degenerate triangles created may be reduced. The number of computations at the decoding device (such as a games console) may be reduced as a result of this, thereby improving the performance of the device when generating images for display. Further to this, the bitstream data structure that has been described may in some cases be particularly advantageous for GPU computation and generating the triangles in parallel.

Geometry shaders can be used to amplify the geometry information for the clusters, but this is generally not sufficient for good performance for the encoding process. Instead, or in addition, hardware support of primitive and/or mesh shaders is required to have a good performance.

In some cases, it is possible to modify the above process so as to handle particular datasets more efficiently or effectively. These modifications may be tailored to specific geometric configurations, for example, or a particular size of primitive cluster. For example, with a cluster size of sixty-four vertices a wavefront intrinsics based method may be implemented for thread group wide bitfield operations so as to only require sixteen bytes per cluster.

Figure 6:
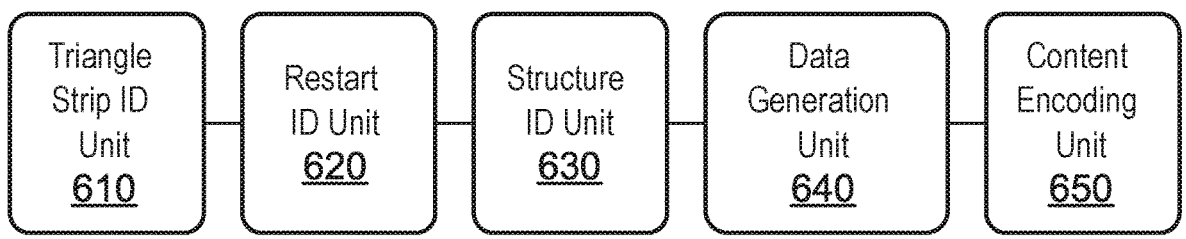
FIG. 6 schematically illustrates an encoding system.

FIG. 6 schematically illustrates an encoding system operable to encode content in line with the above methods. The encoding system 600 comprises a triangle strip identification unit 610, a restart identification unit 620, a structure identification unit 630, a data generation unit 640, and a content encoding unit 650. In some embodiments, the encoding system is implemented on a GPU, while in others it may be implemented using a CPU (or a combination of the two).

The triangle strip identification unit 610 is operable to identify a plurality of triangle strips representing at least a portion of a three-dimensional object mesh. This may comprise identifying the strips from the mesh by performing a strip generation process, and/or identifying the strips from associated metadata or the like which comprises information about one or more strips within the mesh.

The restart identification unit 620 is operable to identify one or more restart indices used to signify the start of a new triangle strip. As above, this may comprise an analysis of the index buffer describing the triangles to identify restart indices, or may comprise an analysis of associated metadata or the like to identify the location of restart indices.

The structure identification unit 630 is operable to identify one or more arrangements of triangles within the triangle strips. In some embodiments, the structure identification unit 630 is operable to identify a triangle fan structure as an arrangement of triangles; although it should be considered that any suitable structure may be identified as an arrangement of triangles as appropriate.

The data generation unit 640 is operable to generate data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices. The information may be encoded as a single encoded data structure, in some embodiments.

Alternatively, in some embodiments, the data generation unit 640 is operable to generate a bitstream separate from the set of indices which comprises the information identifying the start of a new triangle strip and information identifying a structure of a given triangle strip for one or more triangle strips. This bitstream may be provided in conjunction with the triangle data, or may be obtained as associated metadata.

The content encoding unit 650 is operable to encode the generated data for output; this may be considered to be information representing at least a portion of a virtual scene, in some embodiments. Of course, the output data may be used for any suitable image generation process. As discussed above, the encoded content may take the form of an encoded index buffer and an associated bitstream comprising information about the arrangement of the indices into triangles when reconstructing the triangle strips and associated meshes.

In some embodiments, the content encoding unit 650 is operable to perform any suitable compression techniques as a part of the encoding process so as to reduce the overall amount of data that is output. For example, the content encoding unit 650 may be operable to encode the information identifying the start of a new triangle strip and information identifying a structure of a given triangle strip for one or more triangle strips are each using a run length coding scheme.

In some embodiments, the encoding system 600 may also comprise a mesh obtaining unit that is operable to obtain a mesh representing a three-dimensional object present in a virtual scene to be rendered. For example, this may be a mesh that corresponds to a model present within an in-game environment—although any suitable mesh may of course be considered.

In some embodiments, the mesh may be obtained with associated information that identifies a plurality of triangle strips representing at least a portion of the three-dimensional mesh. However, the encoding system 600 may further comprise a triangle strip generation unit that is operable to generate a plurality of triangle strips from the obtained mesh. Of course, a combination of these may also be used—if limited triangle strip data is provided, then the triangle strip generation unit may be operable to generate triangle strips for parts of the mesh with which no triangle strips are associated.

In some embodiments in which the encoding system 600 comprises the triangle strip generation unit, the triangle strip generation unit is operable to perform a standard strip generation method in accordance with existing methods. That is, the resulting index buffer is generated so as to include the restart indices and the like. Alternatively, the triangle strip generation unit may be operable to generate one or more restart indices used to signify the start of a new triangle strip and information identify one or more predetermined arrangements of triangles within the triangle strips as metadata associated with the triangle strips, and to encode these separately in a manner that reduces the processing required by the data generation unit 640.

The arrangement of FIG. 6 is an example of a processor (for example, a GPU and/or CPU located in a games console or any other computing device) that is operable to perform a content encoding method in line with the above discussion, and in particular is operable to:

identify a plurality of triangle strips representing at least a portion of a three-dimensional object mesh;

identify one or more restart indices used to signify the start of a new triangle strip;

identify one or more arrangements of triangles within the triangle strips;

generate data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices; and encode the generated data for output.

Figure 7:
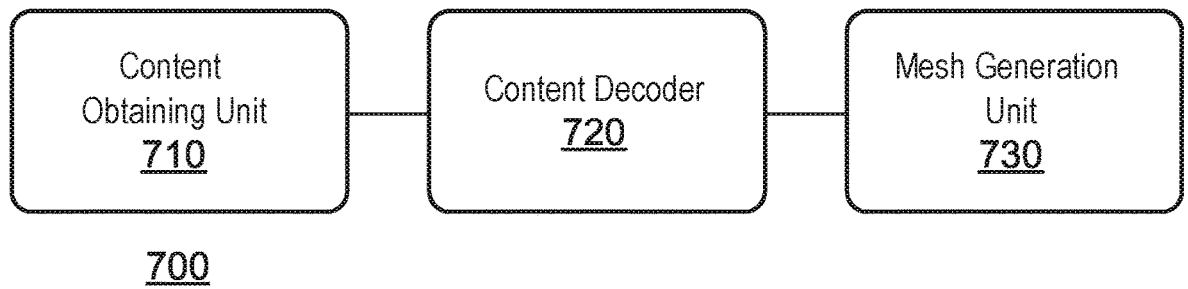
FIG. 7 schematically illustrates a decoding system.

FIG. 7 schematically illustrates a decoding system operable to decode the content generated by the encoding system 600 of FIG. 6 as described above. The decoding system 700 comprises a content obtaining unit 710, a content decoder 720, and a mesh generation unit 730.

The content obtaining unit 710 is operable to obtain encoded content. This content may be obtained directly from an encoding system (such as the encoding system 600 of FIG. 6) implemented locally (such as on the same device) or remotely (such as via a server or other network connection). Alternatively, or in addition, information may be obtained from any suitable storage medium or network connection.

The content decoder 720 is operable to decode the obtained content to obtain data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices.

The mesh generation unit 730 is operable to generate a three-dimensional mesh in dependence upon the decoded data.

In some embodiments, the decoding system 700 may comprise a rendering unit operable to generate an image for display comprising the generated mesh. Alternatively, or in addition, the decoding system 700 may output the generated mesh to another device or system for storage or other use.

The arrangement of FIG. 7 is an example of a processor (for example, a GPU and/or CPU located in a games console or any other computing device) that is operable to perform a content decoding method in line with the above discussion, and in particular is operable to:

obtain encoded content;

decode the obtained content to obtain data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices; and generate a three-dimensional mesh in dependence upon the decoded data.

Figure 8:
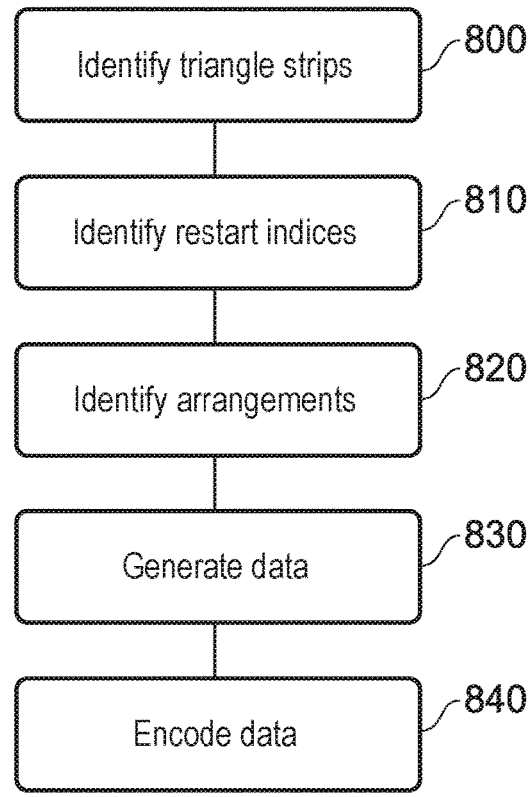
FIG. 8 schematically illustrates an encoding method.

FIG. 8 schematically illustrates an encoding method in which encoded content is generated according to any one of the methods described above.

A step 800 comprises identifying a plurality of triangle strips representing at least a portion of a three-dimensional object mesh.

A step 810 comprises identifying one or more restart indices used to signify the start of a new triangle strip.

A step 820 comprises identifying one or more arrangements of triangles within the triangle strips.

A step 830 comprises generating data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices.

A step 840 comprises encoding the generated data for output.

Figure 9:
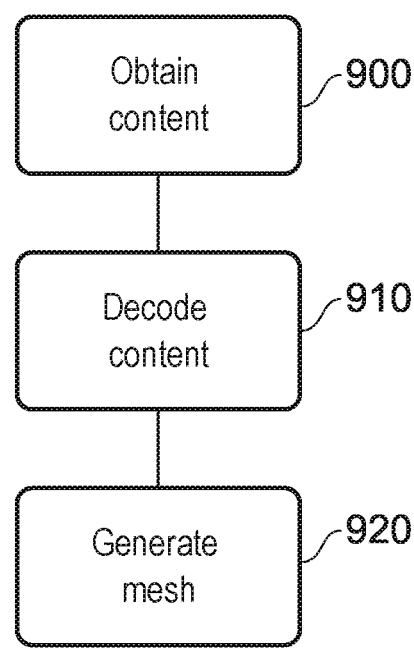
FIG. 9 schematically illustrates a decoding method.

FIG. 9 schematically illustrates a corresponding content decoding method.

A step 900 comprises obtaining encoded content; this may be the content generated by the method of FIG. 8, for example.

A step 910 comprises decoding the obtained content to obtain data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices; and A step 920 comprises generating a three-dimensional mesh in dependence upon the decoded data. In some embodiments, this mesh may later be used as a part of an image rendering process.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented according to any of the following numbered clauses:

1. An encoding system comprising:
    a triangle strip identification unit operable to identify a plurality of triangle strips representing at least a portion of a three-dimensional object mesh;
    a restart identification unit operable to identify one or more restart indices used to signify the start of a new triangle strip;
    a structure identification unit operable to identify one or more arrangements of triangles within the triangle strips;
    a data generation unit operable to generate data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices; and
    a content encoding unit operable to encode the generated data for output.

2. A system according to clause 1, comprising a mesh obtaining unit operable to obtain a mesh representing a three-dimensional object present in a virtual scene to be rendered.

3. A system according to clause 2, comprising a triangle strip generation unit operable to generate a plurality of triangle strips from the obtained mesh.

4. A system according to clause 3, wherein the triangle strip generation unit is operable to generate one or more restart indices used to signify the start of a new triangle strip and information identify one or more predetermined arrangements of triangles within the triangle strips as metadata associated with the triangle strips.

5. A system according to any preceding clause, wherein the structure identification unit is operable to identify a triangle fan structure as an arrangement of triangles.

6. A system according to any preceding clause, wherein the data generation unit is operable to generate a bitstream separate from the set of indices which comprises the information identifying the start of a new triangle strip and information identifying a structure of a given triangle strip for one or more triangle strips.

7. A system according to any preceding clause, wherein the content encoding unit is operable to encode the information identifying the start of a new triangle strip and information identifying a structure of a given triangle strip for one or more triangle strips are each using a run length coding scheme.

8. A system according to any preceding clause, wherein the encoded data comprises information representing at least a portion of a virtual scene.

9. An encoding method comprising:
identifying a plurality of triangle strips representing at least a portion of a three-dimensional object mesh;
identifying one or more restart indices used to signify the start of a new triangle strip;
identifying one or more arrangements of triangles within the triangle strips;
generating data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices; and
encoding the generated data for output.

10. A decoding system comprising:
a content obtaining unit operable to obtain encoded content;
a content decoder operable to decode the obtained content to obtain data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices; and
a mesh generation unit operable to generate a three-dimensional mesh in dependence upon the decoded data.

11. A system according to clause 10, comprising a rendering unit operable to generate an image for display comprising the generated mesh.

12. A decoding method comprising:
obtaining encoded content;
decoding the obtained content to obtain data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices; and
generating a three-dimensional mesh in dependence upon the decoded data.

13. Computer software which, when executed by a computer, causes the computer to carry out the method of clause 12.

14. A non-transitory machine-readable storage medium which stores computer software according to clause 13.

The invention claimed is:

1. An encoding system comprising:
a triangle strip identification unit operable to identify a plurality of triangle strips representing at least a portion of a three-dimensional object mesh;
a restart identification unit operable to identify one or more restart indices used to signify the start of a new triangle strip;
a structure identification unit operable to identify one or more arrangements of triangles within the triangle strips;
a data generation unit operable to generate data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices; and
a content encoding unit operable to encode the generated data for output.

2. The system of claim 1, comprising a mesh obtaining unit operable to obtain a mesh representing a three-dimensional object present in a virtual scene to be rendered.

3. The system of claim 2, comprising a triangle strip generation unit operable to generate a plurality of triangle strips from the obtained mesh.

4. The system of claim 3, wherein the triangle strip generation unit is operable to generate one or more restart indices used to signify the start of a new triangle strip and information identify one or more predetermined arrangements of triangles within the triangle strips as metadata associated with the triangle strips.

5. The system of claim 1, wherein the structure identification unit is operable to identify a triangle fan structure as an arrangement of triangles.

6. The system of claim 1, wherein the data generation unit is operable to generate a bitstream separate from the set of indices which comprises the information identifying the start of a new triangle strip and information identifying a structure of a given triangle strip for one or more triangle strips.

7. The system of claim 1, wherein the content encoding unit is operable to encode the information identifying the start of a new triangle strip and information identifying a structure of a given triangle strip for one or more triangle strips are each using a run length coding scheme.

8. The system of claim 1, wherein the encoded data comprises information representing at least a portion of a virtual scene.

9. An encoding method comprising:
identifying a plurality of triangle strips representing at least a portion of a three-dimensional object mesh;
identifying one or more restart indices used to signify the start of a new triangle strip;
identifying one or more arrangements of triangles within the triangle strips;

generating data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices; and encoding the generated data for output.

10. A decoding system comprising:

a content obtaining unit operable to obtain encoded content;

a content decoder operable to decode the obtained content to obtain data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices; and a mesh generation unit operable to generate a three-dimensional mesh in dependence upon the decoded data.

11. The system of claim 10, comprising a rendering unit operable to generate an image for display comprising the generated mesh.

12. A decoding method comprising:

obtaining encoded content;

decoding the obtained content to obtain data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices; and generating a three-dimensional mesh in dependence upon the decoded data.

13. A non-transitory machine-readable storage medium which stores computer software which, when executed by a computer, causes the computer to perform an encoding method comprising the steps of:

identifying a plurality of triangle strips representing at least a portion of a three-dimensional object mesh;

identifying one or more restart indices used to signify the start of a new triangle strip;

identifying one or more arrangements of triangles within the triangle strips;

generating data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices; and encoding the generated data for output.

14. A non-transitory machine-readable storage medium which stores computer software which, when executed by a computer, causes the computer to perform a decoding method comprising the steps of:

obtaining encoded content;

decoding the obtained content to obtain data comprising a set of indices representing the plurality of triangle strips, information identifying the start of a new triangle strip, and information identifying a structure of a given triangle strip for one or more triangle strips, wherein the information identifying the start of a new triangle strip and the information identifying a structure of a given triangle strip are not provided in the set of indices; and generating a three-dimensional mesh in dependence upon the decoded data.

* * * * *